(12) United States Patent
Xu et al.

(10) Patent No.: US 12,546,649 B2
(45) Date of Patent: Feb. 10, 2026

(54) INSPECTING TOOL FOR INSPECTING MICRO LED ARRAY PANEL

(71) Applicant: JADE BIRD DISPLAY (SHANGHAI) LIMITED, Shanghai (CN)

(72) Inventors: Chenchao Xu, Shanghai (CN); Yang Yue, Shanghai (CN); Qiming Li, Shanghai (CN)

(73) Assignee: JADE BIRD DISPLAY (SHANGHAI) LIMITED, Shanghai (CN)

( * ) Notice: Subject to any disclaimer, the term of this patent is extended or adjusted under 35 U.S.C. 154(b) by 100 days.

(21) Appl. No.: 18/719,842

(22) PCT Filed: Dec. 16, 2021

(86) PCT No.: PCT/CN2021/138836
§ 371 (c)(1),
(2) Date: Jun. 14, 2024

(87) PCT Pub. No.: WO2023/108548
PCT Pub. Date: Jun. 22, 2023

(65) Prior Publication Data
US 2025/0060248 A1    Feb. 20, 2025

(51) Int. Cl.
*G01J 1/04*          (2006.01)

(52) U.S. Cl.
CPC .......... *G01J 1/0422* (2013.01); *G01J 1/0403* (2013.01)

(58) Field of Classification Search
CPC .............................. G01J 1/0422; G01J 1/0403
See application file for complete search history.

(56) References Cited

U.S. PATENT DOCUMENTS 6,222,632 B1 *  4/2001  Bakin ................ G01J 3/453
                                          356/453
2003/0215129 A1   11/2003  Yang et al.

FOREIGN PATENT DOCUMENTS

CN     102871679 A     1/2013
CN     109655233 A     4/2019
(Continued)

OTHER PUBLICATIONS

International Search Report and Written Opinion in PCT Application No. PCT/CN2021/138836, dated Aug. 29, 2022.

*Primary Examiner* — Georgia Y Epps
*Assistant Examiner* — Don J Williams
(74) *Attorney, Agent, or Firm* — FINNEGAN, HENDERSON, FARABOW, GARRETT & DUNNER

(57) ABSTRACT

An inspecting tool for inspecting a micro LED array panel (00) comprises: an optical collector group (01) configured to collect light emitted from a micro LED array included in the micro LED array panel (00): an image detector (02) connected with the optical collector group (01) to receive the light collected by the optical collector group (01) and to capture an image of the micro LED array: and. a light measuring device (03) electrically connected with the optical collector group (01) to receive the light collected by the optical collector group (01) and to measure the light emitted from one or more portions of the micro LED array. The optical collector group (01) comprises a first optical collector (101) connected with the image detector (02) and a second optical collector (102) electrically connected with the light measuring device (03); the first optical collector (101) and the second optical collector (102) are configured on a fixture element (104); and, the fixture element (104) is rotatable at any direction. This inspecting tool can increase the image accuracy.

8 Claims, 1 Drawing Sheet

(56) References Cited

FOREIGN PATENT DOCUMENTS

| | | | |
|---|---|---|---|
| CN | 109959498 | A | 7/2019 |
| CN | 113218628 | A | 8/2021 |
| JP | 2010271246 | A | 12/2010 |

\* cited by examiner

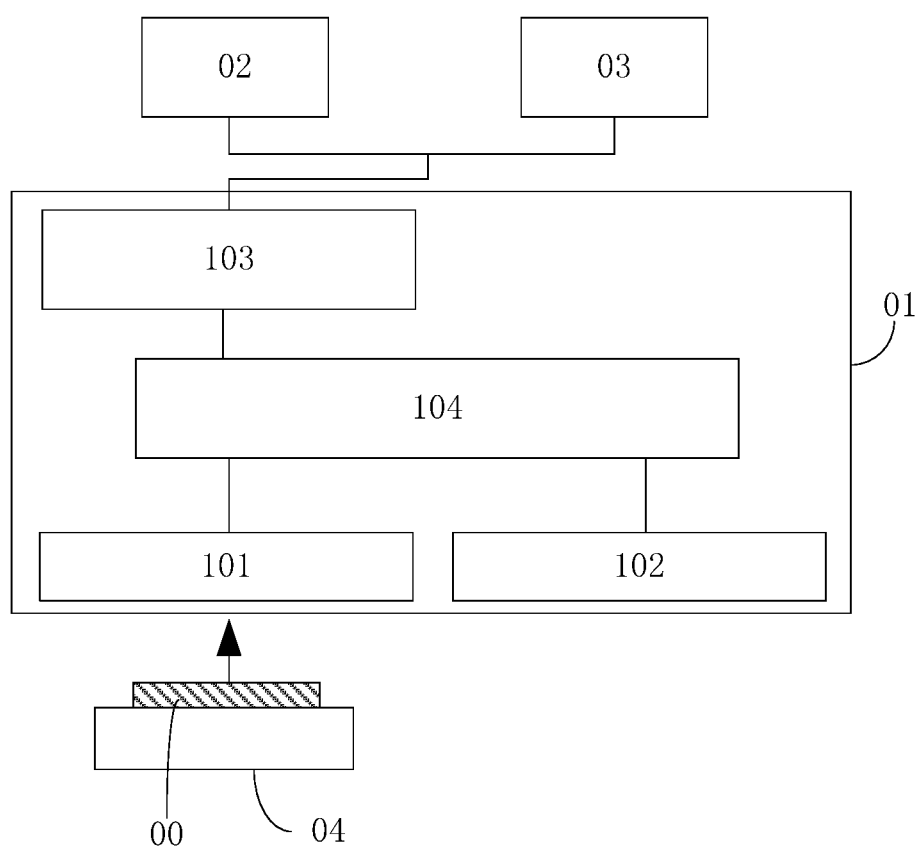

INSPECTING TOOL FOR INSPECTING MICRO LED ARRAY PANEL

CROSS-REFERENCES TO RELATED APPLICATIONS

The present application is a U.S. National Phase Application of International Application No. PCT/CN2021/138836, filed on Dec. 16, 2021, the contents of which are incorporated herein by reference in the entirety.

FIELD OF THE DISCLOSURE

The present disclosure generally relates to a light emitting diode technology field and, more particularly, to an inspecting tool for inspecting a micro light emitting diode (LED) array panel.

BACKGROUND OF THE DISCLOSURE

Micro LED with extra small area and high resolution is increasingly popular in the world. A micro LED array panel can be used to form various kinds of devices, such as camera module, projection modules, display modules, VR/AR optical modules and so on.

However, because a light emitting area and an image displayed by the micro LED array panel are much smaller than before, pixel defects of the micro LED array panel are not easy to be detected and identified by conventional methods. Thus, operators need to review a wafer, a chip, and a mask through a graphical user interface displaying various pattern images of the micro LED panel, so as to identify pattern defects.

Additionally, the light emitting area of the micro LED array panel is very small, such as 3 mm*5 mm. But a collecting area of an optical collector for collecting the light emitted by a micro LED array included the micro LED array panel cannot be as small as the light emitting area of the micro LED array panel due to the various optical components in the optical collector. Thus, an image collecting process and a light collecting process cannot be performed at the same time. Furthermore, if the light collecting process and the image collecting process are performed at the same time, the light entered into the optical collector will be weakened, thereby decreasing the image accuracy.

The above content is only used to assist in understanding the technical solutions of the present application and does not constitute an admission that the above is prior art.

BRIEF SUMMARY OF THE DISCLOSURE

In order to overcome the drawback mentioned above, the present disclosure provides an inspect tool for inspecting the micro LED array panel, to improve the detection efficiency and the detection accuracy.

To achieve the above objective, the inspecting tool for inspecting a micro light emitting diode (LED) array panel according to present disclosure, comprising:

an optical collector group configured to collect light emitted from a micro LED array included in the micro LED array panel;

an image detector connected with the optical collector group to receive the light collected by the optical collector group, and configured to capture an image of the micro LED array; and a light measuring device electrically connected with the optical collector group to receive the light collected by the optical collector group, and configured to measure the light emitted from one or more portions of the micro LED array;

wherein, the optical collector group is disposed above the micro LED array panel for collecting the light emitted from any position of the micro LED array; the optical collector group comprises a first optical collector and a second optical collector; wherein, the first optical collector is connected with the image detector; and, the second optical collector is electrically connected with the light measuring device; wherein, the first optical collector group and the second optical collector group is configured on a fixture element; and, the fixture element is rotatable at any direction.

In some embodiments, the first optical collector is disposed above and vertically aligned with the micro LED array via rotating the fixture element; and, the first optical collector is configured to direct the light emitted from the micro LED array to the image detector.

In some embodiments, the second optical collector is disposed above and opposite to the micro LED array via rotating the fixture element; and, the second optical collector is configured to collect the light emitted from one or more portions of the micro LED array.

In some embodiments, a detecting area of the first optical collector is not less than a light emitting area of the micro LED array.

In some embodiments, a detecting area of the second optical collector is larger than the light emitting area of the micro LED array.

In some embodiments, the detecting area of the second optical collector is less than or equal to the light emitting area of the micro LED array.

To achieve the above objective, an inspecting system for inspecting the micro LED array panel at least comprised an aforementioned inspecting tool.

In some embodiments, the inspecting system further comprises a sample stage, for supporting the micro LED array panel.

Many other advantages and features of the present disclosure will be further understood by the following detailed descriptions and the appended drawings.

BRIEF DESCRIPTION OF THE DRAWINGS

FIG. 1 is a schematic diagram illustrating the configuration of an inspecting tool according to an embodiment of the present disclosure;

DETAILED DESCRIPTION OF THE EMBODIMENTS

Reference will now be made in detail to the present preferred embodiments to provide a further understanding of the disclosure. The specific embodiments and the accompanying drawings discussed are merely illustrative of specific ways to make and use the disclosure, and do not limit the scope of the disclosure or the appended claims.

Referring to FIG. 1, an inspecting tool for inspecting the micro LED array panel 00 of according to an embodiment of the present disclosure comprises:

an optical collector group 01 configured to collect light emitted from a micro LED array included in the micro LED array panel 00;

an image detector 02 connected with the optical collector group 01 to receive the light collected by the optical collector group 01, and configured to capture an image of the micro LED array; and, a light measuring device 03 electrically connected with the optical collector group 01 to receive the light collected by the optical collector group 01, and configured to measure the light emitted from one or more portions of the micro LED array.

Herein, the optical collector group 01 is disposed above the micro LED array panel 00 for collecting the light emitted from any position of the micro LED array; the optical collector group 01 comprises a first optical collector 101 and a second optical collector 102; wherein, the first optical collector 101 is connected with the image detector 02; and, the second optical collector 102 is electrically connected with the light measuring device 03; herein, the first optical collector 101 and the second optical collector 102 is configured on a fixture element 104; and, the fixture element 104 is rotatable at any direction. A light transmitting channel 103 penetrates through the fixture element 103 and is connected with the first optical collector 101 or the second optical collector 102. When the fixture element 104 rotates such that the first optical collector 101 is located above and vertically aligned with the micro LED array panel 00, the light transmitting channel 103 is connected with the first optical collector 101 and the image detector 02 is at working state and acquires the light collected by the first optical collector 101. When the fixture element 104 rotates such that the second optical collector 102 is located above and vertically aligned with the micro LED array panel 00, the light transmitting channel 103 is connected with the second optical collector 102 and the light measuring device 03 is at working state and acquire the light collected by the second optical collector 102. It is noted that, the position of the micro LED array panel 00 is adjusted to align with the light transmitting channel 103 by moving a sample stage 04 on which the micro LED array panel 00 is disposed.

Additionally, the image detector 02 may include, but is not limited to, a charge coupled device detector, a photo multiplier tube detector and the like. The light measuring device 03 may include, but not limited to, a spectrometer. The light measuring device 03 can measure any optical parameters of the emitting light such as half-peak breadth, the peak breadth and so on.

The first optical collector 101 is disposed above and vertically aligned with the micro LED array via rotating the fixture element 104; and, the first optical collector 101 directs the light emitted from the micro LED array to the image detector 02.

Herein, the first optical collector 101 comprises various optical components to collect and direct the light emitted from the micro LED array. The optical elements may comprise lenses, mirrors, filters, beam splitters, and the like. For example, a filter may be arranged between the first optical collector and the image detector in the light path, for filtering the unexpected lights or weakening the light strength.

The second optical collector 102 is disposed above and vertically aligned with the micro LED array via rotating the fixture element 104; and, the second optical collector 102 collects the light from one or more portions of the micro LED array.

It is noted that, in the embodiment, a detecting area of the first optical collector 101 is larger than a light emitting area of the micro LED array. In another embodiment, the detecting area of the first optical collector 101 may be equal to the light emitting area of the micro LED array panel 00.

Additionally, a detecting area of the second optical collector 102 is larger than the light emitting area of the micro LED array according to the embodiment. In another embodiment, the detecting area of the second optical collector 102 may be less than or equal to the light emitting area of the micro LED array panel 00.

It is noted that, the second optical collector 102 may be electrically connected with the light measuring device 03 via a conductive line. For example, the conductive line may be an optical fiber.

The aforementioned inspecting tool may be used for any system for detecting the micro LED array panel; such as a pixel defect inspecting system, an optical inspecting system, and so on. Additionally, the micro LED array panel may one piece, or more pieces disposed in one wafer. The micro LED array panel is supported on a sample stage. The sample stage may move at any direction and/or rotating at any angle, to align the micro LED array panel with the first optical collector.

During operation, the first optical collector 01 may be adjusted to an optimized position for acquiring one or more parts of a clear image of the micro LED array. When the micro LED array panel 00 is aligned with the first optical collector 01, the inspecting process can be started without adjusting the position of the second optical collector 02.

The micro LED array panel is a micro self-emitting panel. The LED in the panel may be an organic LED or an inorganic LED. The light emitting area of the micro LED array panel 00 is very small, such as 3 mm*5 mm. It is noted that, the light emitting area is the area of the micro LED array. The micro LED array panel comprises a micro LED array that forms a pixel array, such as 1600×1200, 680×480, 1920×1080. The diameter of the micro LED is in the range of 200 nm~2 μm. But the collecting area of the first optical collector cannot be as small as the light emitting area of the micro LED array panel due to the various optical components in the first optical collector 01, which prevents the light directly arriving at the second optical collector 02 if the first optical collector 01 is arranged in the vertical direction. Thus, the configuration of the first optical collector and the second optical collector in the embodiments of the present disclosure can solve this problem. An IC back plane is formed at the back surface of the micro LED array and electrically connected with the micro LED array. The IC back plane acquires signals such as image data from outside via signal lines to control a corresponding micro LED to emit light. The IC back plane generally employs an 8-bit Digital to analog converter (DAC). The 8-bit DAC has 256 levels of manifestations, and each level corresponds to one gray level, that is, the 8-bit DAC may provide 256 different gray levels. Since any one of the 256 gray levels may be applied on the micro LED, a gray level ranging from 0 to 255 may be displayed by one pixel. Optionally, a brightness value of the micro LED can be controlled by voltage amplitudes or current amplitudes of the signals acquired by the IC back plane, while the gray levels can be shown by time intervals, e.g., pulse widths, of the signals.

It is noted that, the first optical collector and the second optical collector are separately arranged in the embodiments. But in another embodiments, the first optical collector and the second optical collector can be configured together to form one light collecting area; for example, the first optical collector is in working state, while the second optical collector is in un-working state; or, the first optical collector is in un-working state, while the second optical collector is in working state. So the light transmitting rout for first optical collector and the second optical collector can share one light transmitting rout or different transmitting rout according to the scope of the present disclosure.

The above descriptions are merely embodiments of the present disclosure, and the present disclosure is not limited thereto. A modifications, equivalent substitutions and improvements made without departing from the conception and principle of the present disclosure shall fall within the protection scope of the present disclosure.

The invention claimed is:

1. An inspecting tool for inspecting a micro light emitting diode (LED) array panel, comprising:
    an optical collector group configured to collect light emitted from a micro LED array included in the micro LED array panel;
    an image detector connected with the optical collector group to receive the light collected by the optical collector group, and configured to capture an image of the micro LED array; and
    a light measuring device electrically connected with the optical collector group to receive the light collected by the optical collector group, and configured to measure the light emitted from one or more portions of the micro LED array;
    wherein, the optical collector group is disposed above the micro LED array panel for collecting the light emitted from any position of the micro LED array; the optical collector group comprises a first optical collector and a second optical collector;
wherein, the first optical collector is connected with the image detector; and, the second optical collector is electrically connected with the light measuring device; wherein, the first optical collector and the second optical collector is configured on a fixture element; and, the fixture element is rotatable at any direction.

2. The inspecting tool for inspecting the micro LED array panel according to claim 1, wherein, the first optical collector is disposed above and vertically aligned with the micro LED array via rotating the fixture element; and, the first optical collector is configured to direct the light emitted from the micro LED array to the image detector.

3. The inspecting tool for inspecting the micro LED array panel according to claim 2, wherein, the second optical collector is disposed above and opposite to the micro LED array via rotating the fixture element; and, the second optical collector is configured to collect the light emitted from one or more portions of the micro LED array.

4. The inspecting tool for inspecting the micro LED array panel according to claim 3, wherein, a detecting area of the first optical collector is not less than a light emitting area of the micro LED array.

5. The inspecting tool for inspecting the micro LED array panel according to claim 4, wherein, a detecting area of the second optical collector is larger than the light emitting area of the micro LED array.

6. The inspecting tool for inspecting the micro LED array panel according to claim 4, wherein, the detecting area of the second optical collector is less than or equal to the light emitting area of the micro LED array.

7. An inspecting system for inspecting the micro LED array panel at least comprised an inspecting tool according to claim 1.

8. The inspecting system according to claim 7, wherein, the inspecting system further comprises a sample stage, for supporting the micro LED array panel.

* * * * *